US009785875B2

(12) United States Patent
Nitta

(10) Patent No.: US 9,785,875 B2
(45) Date of Patent: Oct. 10, 2017

(54) IMAGE FORMING APPARATUS AND IMAGE FORMATION METHOD THAT REDUCES RESTRICTION OF FUNCTION EVEN IN CASE WHERE FAILURE HAPPENS IN STORAGE DEVICE

(71) Applicant: KYOCERA Document Solutions Inc., Osaka (JP)

(72) Inventor: Kenichiro Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 45 days.

(21) Appl. No.: 14/801,664

(22) Filed: Jul. 16, 2015

(65) Prior Publication Data

US 2016/0021276 A1   Jan. 21, 2016

(30) Foreign Application Priority Data

Jul. 16, 2014 (JP) ................................. 2014-145756

(51) Int. Cl.
G06F 9/44 (2006.01)
G06K 15/00 (2006.01)
G06F 11/07 (2006.01)

(52) U.S. Cl.
CPC ........ *G06K 15/408* (2013.01); *G06F 11/0733* (2013.01); *G06F 11/0793* (2013.01); *G06K 15/00* (2013.01)

(58) Field of Classification Search
CPC .... H04N 1/21; H04N 1/00278; H04N 1/2392; H04N 1/32635; G06K 15/408;

(Continued)

(56) References Cited

U.S. PATENT DOCUMENTS 5,666,540 A * 9/1997 Hagiwara ............. G06F 9/4418
713/321
6,281,894 B1 * 8/2001 Rive ..................... G06F 9/4406
358/1.14

(Continued)

FOREIGN PATENT DOCUMENTS

JP 2005-157713 A 6/2005
JP 2006-113680 A 4/2006

(Continued)

OTHER PUBLICATIONS

English Machine Translation of JP 2006-113680-A (Sugino, Published Apr. 27, 2006).*

Primary Examiner — Benny Q Tieu
Assistant Examiner — Juan M Guillermety
(74) Attorney, Agent, or Firm — Hawii Patent Services; Nathaniel K. Fedde; Kenton N. Fedde

(57) ABSTRACT

Provided is an image forming apparatus that enables use in a state even in a case where failure happens in a first storage device. The first storage device has a plurality of partitions that store data for each various function in connection with image formation. A second storage device stores an application program for executing the various function in about image formation. The second storage device has the same partition as the partition of the first storage device. A control part performs mounting process for each partition of the first storage device at the time of a start process. Next, the control part reads the application program in the second storage device. Also, control part performs mounting process for the same partition of the second storage device as the failed partition when the mounting process either of partitions fails.

2 Claims, 7 Drawing Sheets

(58) Field of Classification Search
CPC .. G06K 15/00; G06F 9/00; G06F 9/06; G06F 9/44; G06F 9/4401; G06F 9/4406; G06F 9/4408; G06F 9/4411; G06F 11/00; G06F 11/07; G06F 11/14; G06F 11/1402; G06F 11/1415; G06F 11/1417; G06F 2211/1097; G06F 11/0793
USPC ..................................... 358/1.14, 1.15, 1.16
See application file for complete search history.

(56) References Cited

U.S. PATENT DOCUMENTS

| | | | |
|---|---|---|---|
| 8,006,125 B1* | 8/2011 | Meng ................ | G06F 11/1417 714/6.2 |
| 2003/0059221 A1* | 3/2003 | Funahashi ............ | G06K 15/00 399/8 |
| 2005/0057771 A1* | 3/2005 | Ohishi ................. | G06F 3/1296 358/1.15 |
| 2005/0114615 A1 | 5/2005 | Ogasawara et al. | |
| 2005/0138287 A1 | 6/2005 | Ogasawara et al. | |
| 2006/0230227 A1 | 10/2006 | Ogasawara et al. | |
| 2008/0040595 A1* | 2/2008 | Kasuga ............... | G06F 9/4406 713/2 |
| 2008/0114933 A1 | 5/2008 | Ogasawara et al. | |
| 2010/0153628 A1* | 6/2010 | Jang .................... | G06F 9/4401 711/103 |
| 2010/0235615 A1* | 9/2010 | Manczak ............. | G06F 9/4406 713/2 |
| 2012/0011395 A1* | 1/2012 | Chou .................. | G06F 11/1417 714/6.13 |
| 2014/0129820 A1* | 5/2014 | Lim .................... | G06F 9/4401 713/2 |
| 2014/0153030 A1* | 6/2014 | Ikeda .................. | G06K 15/408 358/1.14 |
| 2014/0201480 A1* | 7/2014 | Factor ................. | G06F 11/1402 711/162 |
| 2015/0092218 A1* | 4/2015 | Wakamatsu ......... | G06F 3/1288 358/1.14 |
| 2015/0106610 A1* | 4/2015 | Cao .................... | G06F 9/4401 713/2 |
| 2015/0355974 A1* | 12/2015 | Hayes ................. | G06F 11/1415 714/15 |

FOREIGN PATENT DOCUMENTS

| | | |
|---|---|---|
| JP | 2007-310758 A | 11/2007 |
| JP | 2009-212677 A | 9/2009 |

* cited by examiner

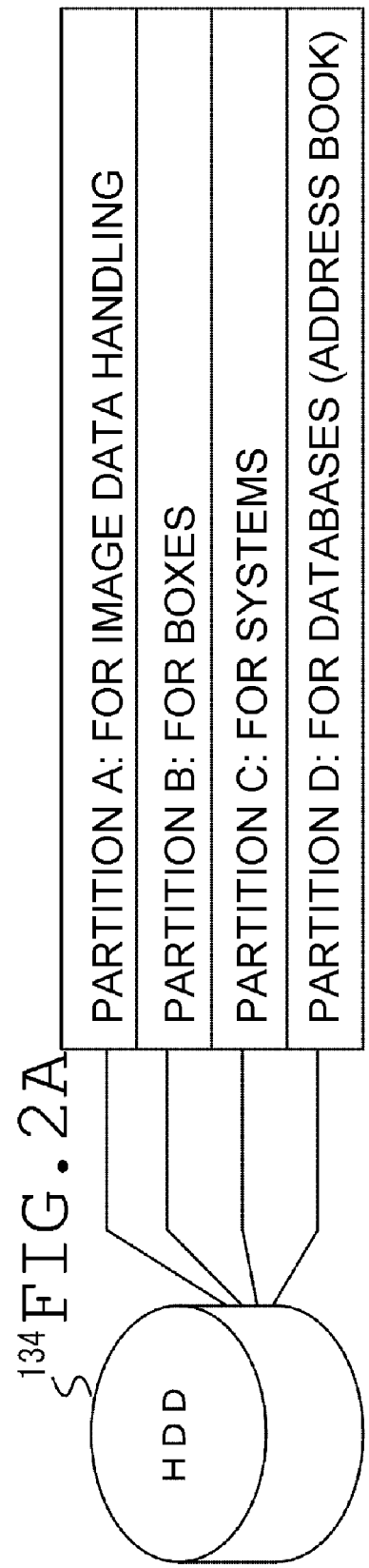

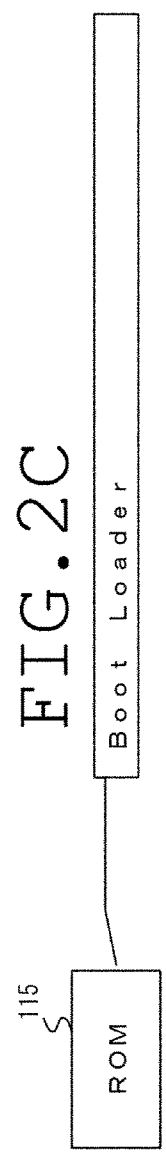

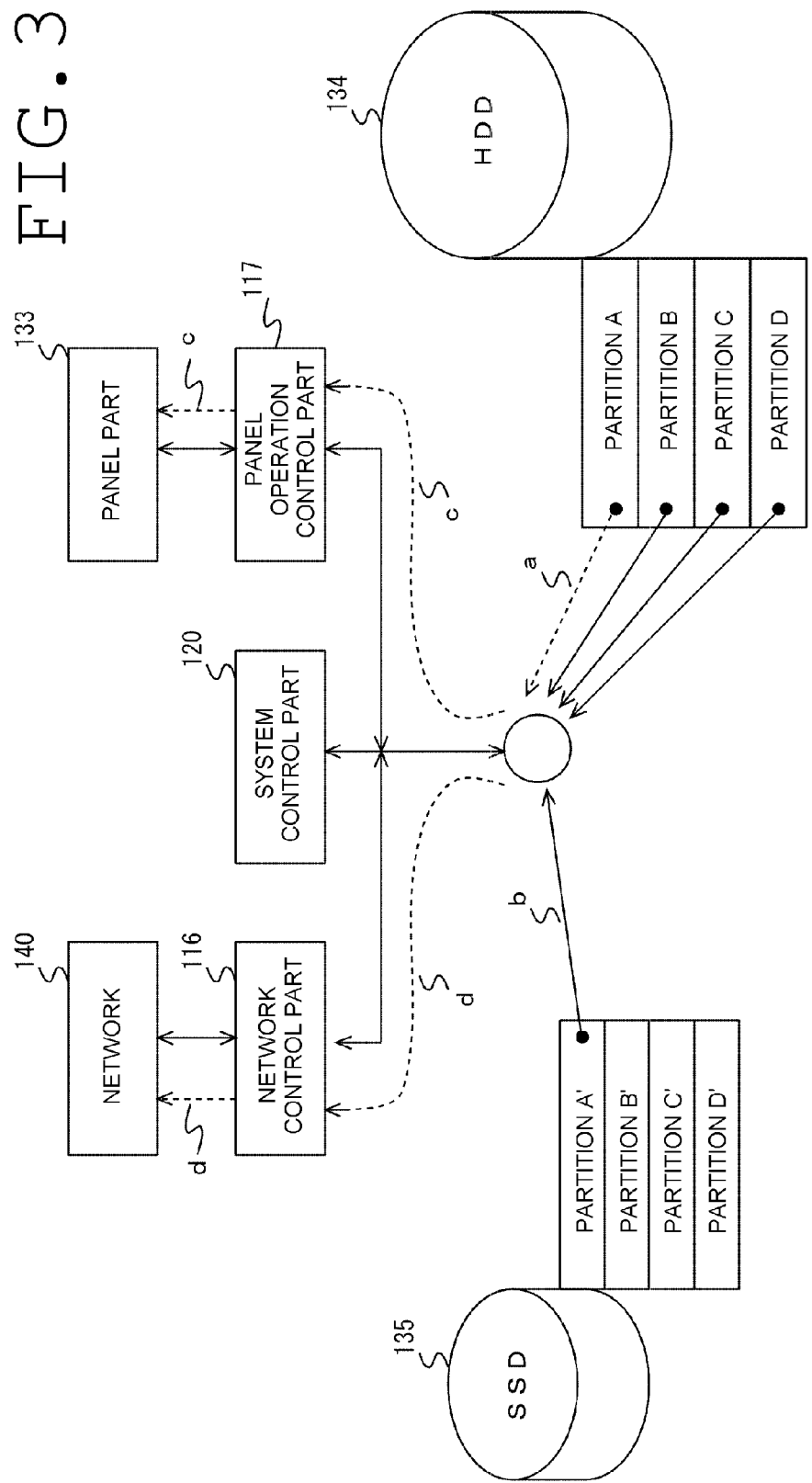

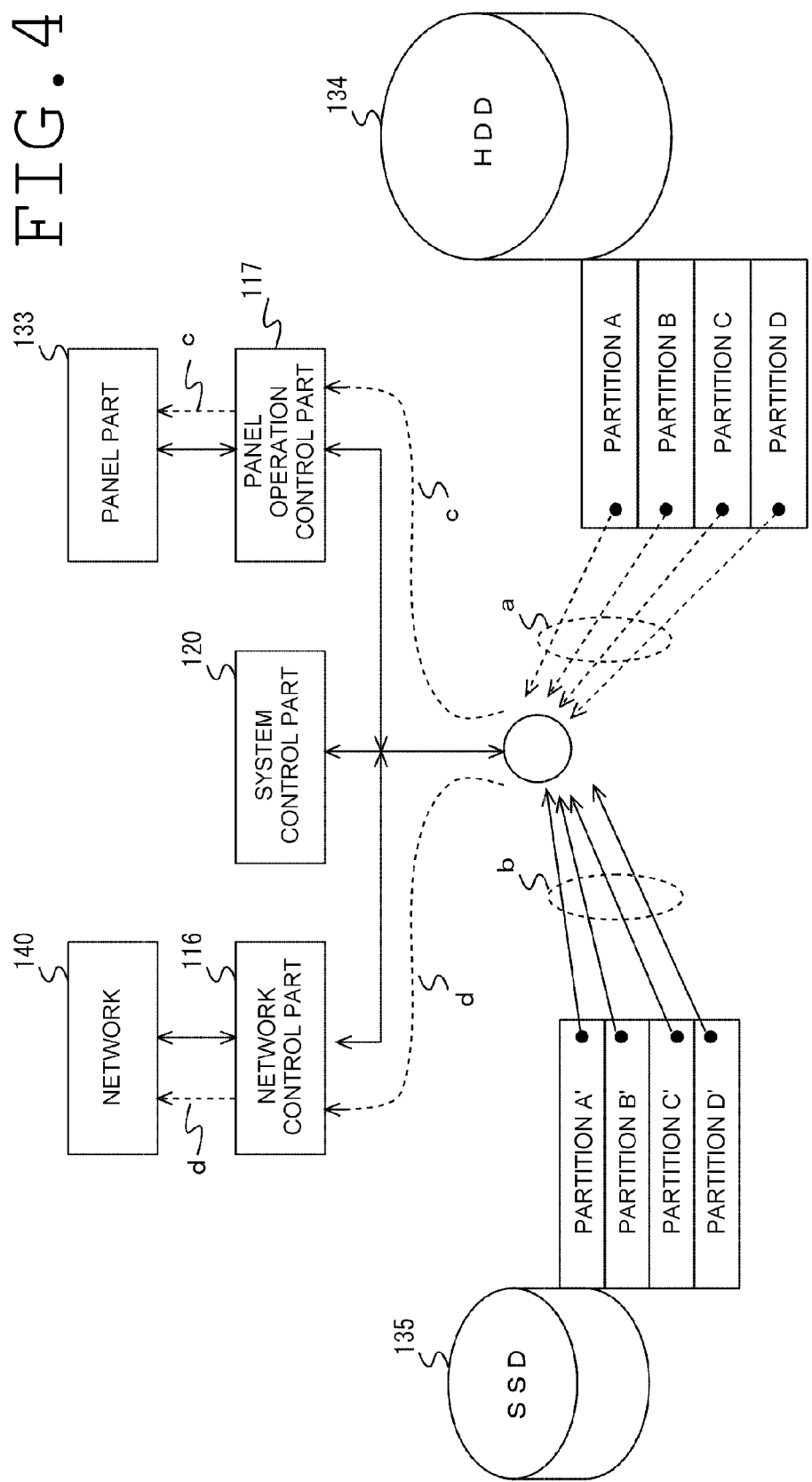

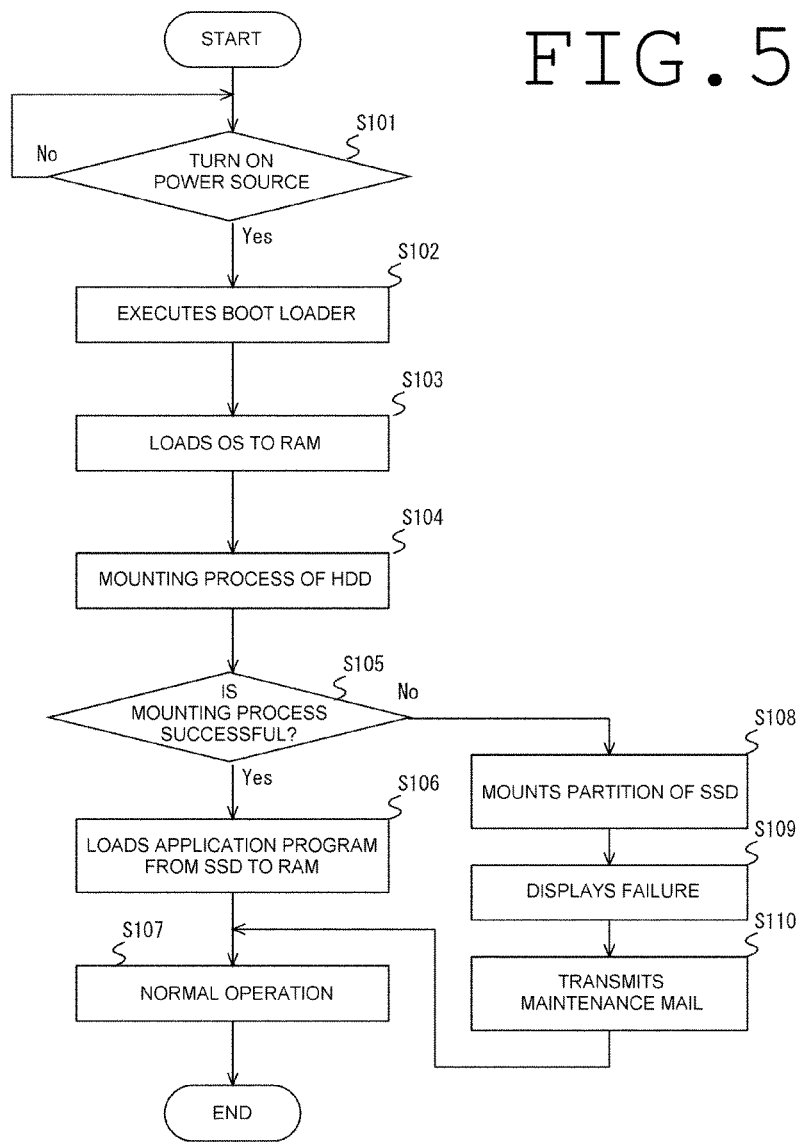

IMAGE FORMING APPARATUS AND IMAGE FORMATION METHOD THAT REDUCES RESTRICTION OF FUNCTION EVEN IN CASE WHERE FAILURE HAPPENS IN STORAGE DEVICE

INCORPORATION BY REFERENCE

This application is based on and claims the benefit of priority from Japanese Patent Application No. 2014-145756 filed on Jul. 16, 2014, the contents of that are hereby incorporated by reference.

BACKGROUND

The present disclosure is related with an image forming apparatus that has a large storage device, such as a HDD (Hard disk drive,) and image formation method.

For example, an image forming apparatus, such as an MFP (Multifunction Peripheral), has a HDD as a large storage device. In HDD, an application program for providing a various function of the MFP, or the like, are memorized. Incidentally, a various function of an MFP is, a multi-operational function of each job, such as a copy, a print, and FAX (Facsimile), a user box function, or the like.

By the way, when HDD serves as out of commission, it becomes impossible to read the application program, or the like, which are memorized in HDD. In this case, the state (down time) where the MFP cannot be used continues until the completion of repairing (HDD replacement) by a serviceman.

In a typical case, even if it is a case where a failure occurs in HDD in a digital MFP, such malfunction is coped with. In the image processing apparatus in this case, until HDD is restored, a respective digital MFP can be worked where a function is restricted. In the case, when a failure occurs in HDD in a digital MFP, various functions provided in the first application memorized in HDD cannot be provided. However, only a function, which can be executed without using HDD, is provided by a second application previously memorized in ROM.

Also, in another typical case, an image forming apparatus that detects a failure position of a storage and restricts the function based on the detected result is proposed. The failure position in the storage is detected, and it displays that the failure having restorative possibility by format is occurred. Then, it has a function that formats a partition including an address of failure.

SUMMARY

An image forming apparatus of the present disclosure includes a first storage device, a second storage device, and a control part. The first storage device has a plurality of partitions that stores data for each various function about image formation. The second storage device stores an application program for executing the various function about the image formation. The second storage device has the same partition as the partition in the first storage device. The control part performs mounting process for the each partition of the first storage device in the case of a start process. Next, the control part reads the application program in the second storage device. Also, the control part, when failing in the mounting process for the either of partitions, performs mounting process for the same partition in the second storage device as the failed partition.

An image formation method of the present disclosure stores the data for each various function about image formation in a first storage device that has a plurality of partitions. Also, in a second storage device that has the same partition as the partition of the first storage device, an application program for executing the various function about the image formation is stored. Also, in the case of a start process, mounting process to each partition of the first storage device is performed. Next, the application program of the second storage device is read. Also, when the mounting process for either of the partitions fails, mounting process for the same partition of the second storage device as the failed partition is performed.

BRIEF DESCRIPTION OF THE DRAWINGS

FIG. 2A is a tablure figure illustrating a configuration of HDD in various storage devices of the image forming apparatus as shown in FIG. 1;

FIG. 2C is a tablure figure illustrating a configuration of ROM in the various storage devices of the image forming apparatus as shown in FIG. 1;

FIG. 3 is a figure for explaining management for failure of a partition of HDD in the image forming apparatus in FIG. 1;

FIG. 4 is a figure for explaining another management for failure of a partition of HDD in the image forming apparatus in FIG. 1; and FIG. 5 is a chart figure for explaining management of failure of a partition of HDD in the image forming apparatus in FIG. 1.

DETAILED DESCRIPTION

Hereinafter, an embodiment of the image forming apparatus of the present disclosure, is explained as refer to FIG. 1-FIG. 5. In addition, as an example of the image forming apparatus in the following explanation, it is a MFP (Multifunction Peripheral,) which is complex peripheral equipment. The MFP equips a plurality of functions, such as a printer function, a facsimile function, and a scanning function, for example.

Figure 1:
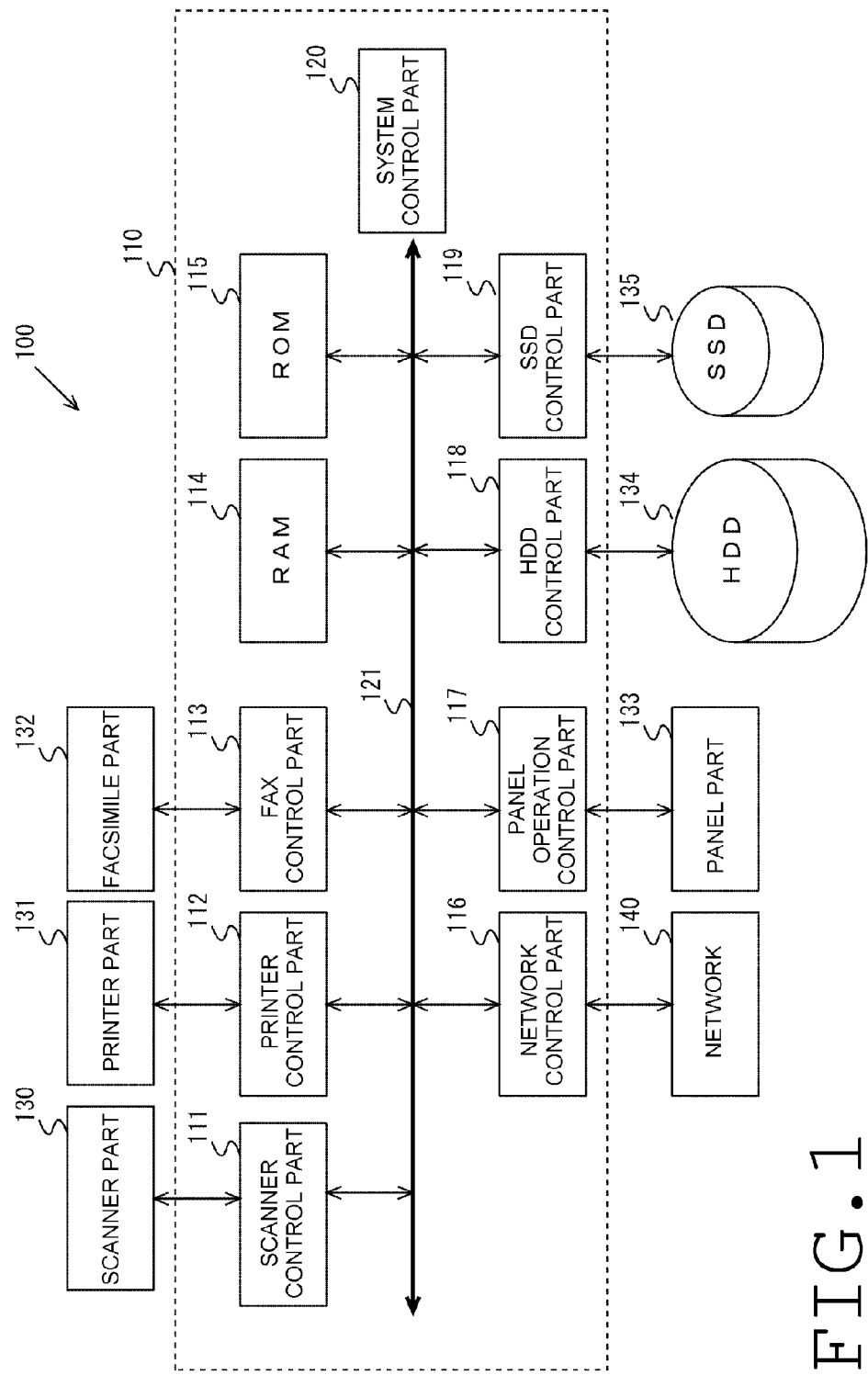
FIG. 1 is a perspective view illustrating one embodiment of the image forming apparatus in the present disclosure.

Firstly, as shown in FIG. 1, MFP 100 includes control part 110, scanner part 130, printer part 131, facsimile part 132, panel part 133, HDD 134, and SSD (solid-state drive) 135.

Scanner part 130 inputs image data of a manuscript read by an image sensor into control part 110. That is, scanner part 130 converts image signal of the manuscript from the image sensor into digital image data. Then, scanner part 130 inputs the image data into control part 110, sequentially.

Printer part 131 prints an image on a paper based on the image data output from control part 110. Facsimile part 132 transmits image data output from control part 110 to a facsimile serving as the other party via a telephone line. Also, facsimile part 132 receives image data from the other party facsimile and inputs it into control part 110. That is, facsimile part 132 controls connection with the telephone line. Then, facsimile part 132 compresses and modulates the image data output from control part 110 and transmits to the other party facsimile. Also, facsimile part 132, while connecting with the telephone line, demodulates and decompresses to the image data from the other party facsimile, and inputs it into control part 110.

Panel part 133 selects the printer function of MFP 100, a facsimile function, or a scanning function. Also, panel part 133 displays for various setup. Also, when failure, or the like, is happened in MFP 100, the icon, or the like, which tell that the occurrence of failure, or the like, is displayed.

HDD 134 memorizes an application program for providing various functions of MFP 100, or the like, which is described later for details. SSD 135 is equipped for storing a program, which is described later for details.

Control part 110 controls entire operation of MFP 100. Control part 110 includes scanner control part 111, printer control part 112, FAX (Facsimile) control part 113, RAM (Random Access Memory) 114, ROM (Read Only Memory) 115, network control part 116, panel operation control part 117, HDD control part 118, SSD control part 119, and system control part 120. Also, these are connected with data bus 121.

Scanner control part 111 controls a reading operation of scanner part 130. Printer control part 112 controls a print operation of printer part 131. FAX control part 113 controls transmission and reception operations of the image data by facsimile part 132.

RAM 114 is a work memory for executing a program. ROM 115 stores a control program, or the like, which performs an operation check of each part, or the like. Network control part 116 controls transmission and reception of a maintenance mail, or the like, which tells a happening for maintenance. Network control part 116 controls transmission and reception via network 140 with I/F (interface.)

In addition, transmission of the maintenance mail may be specific addressing to a serviceman or may be addressing to a maintenance company.

Panel operation control part 117 controls display action of panel part 133. HDD control part 118 controls writing, reading, or the like, for data in HDD 134. SSD control part 119 controls writing, reading, or the like, for data in SSD 135. System control part 120 mainly manages a state of HDD 134. Also, system control part 120 is controlled to use a reserve storage in SSD 135 when malfunctions, such as failure, is happened. It describes later for details.

Then, with reference to FIG. 2, a configuration of HDD 134, SSD 135, and ROM 115 is explained. Firstly, FIG. 2A illustrates a configuration of HDD 134. Partition A-D is included. Partition A is for image data handling. Partition B is for boxes. Partition C is for systems. Partition D is for a database, such as an address book.

Figure 2B:
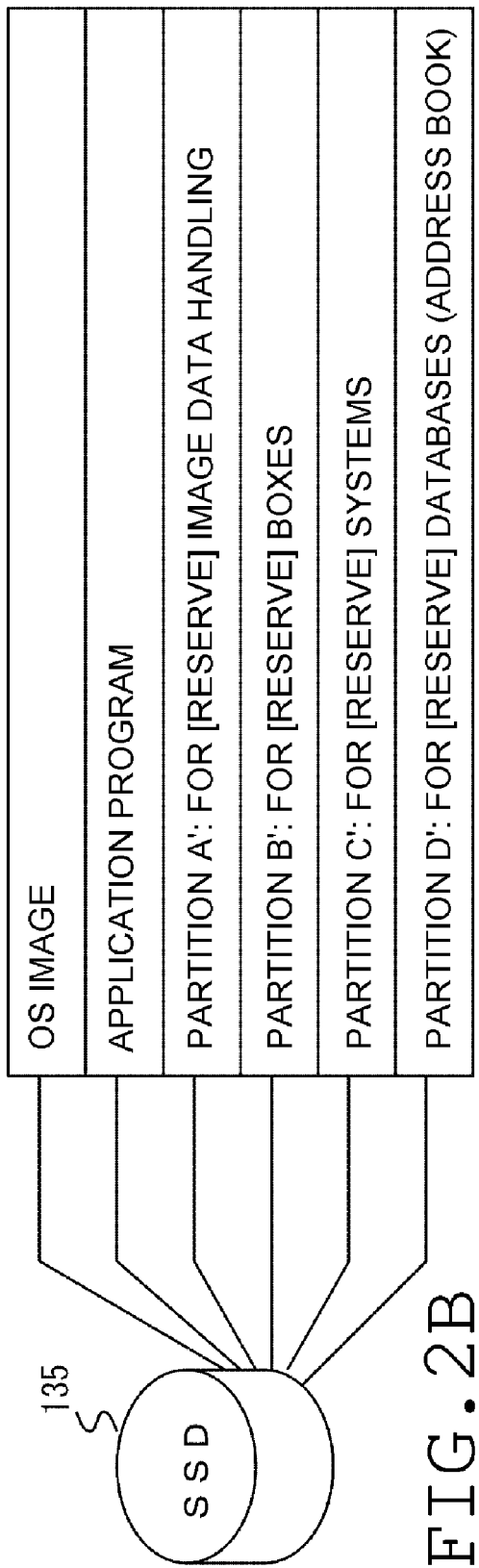
FIG. 2B is a tablure figure illustrating a configuration of SSD in the various storage devices of the image forming apparatus as shown in FIG. 1.

FIG. 2B illustrates a configuration of SSD 135. SSD 135 includes OS (Operating System) image, an application program, and partitions A'-D'. Originally, SSD 135 is equipped to be faster reading speed of an application program. However, in the present embodiment, partitions A'-D' are provided in SSD 135. These partitions A'-D' are provided as a reserve of partition A-D of HDD 134 as mentioned above.

FIG. 2C illustrates a configuration of ROM 115. A boot loader needed for start of a system is stored.

Then, with reference to FIG. 3, an example of process by system control part 120 in case of Napping failure in HDD 134 is explained. Firstly, at the time of start of control part 110, system control part 120 executes mounting process of partition A-D of HDD 134. At this time, suppose that mounting process of partition A is failed as indicated as numerals a. Incidentally, this partition A is for image data handling, as mentioned above.

In this case, system control part 120 mounts partition A' of SSD 135, as indicated as numerals b. Thereby, it replaces with partition A of HDD 134 and is enabled to use of partition A' of SSD 135. Also, partition B-D of HDD 134 can be used as it is. Therefore, for example, it becomes usable the address book in partition D, or the like.

Also, system control part 120 shows an icon or the like, when mounting process of partition A of HDD 134 fails. An icon tells that failure, or the like, occurred to panel part 133 via panel operation control part 117, as indicated as numerals c. Also, system control part 120 makes the maintenance mail transmit as indicated as numerals d. The maintenance mail is mail that tells of happening for the maintenance. System control part 120 transmits with network control part 116 and I/F via network 140.

Thus, when mounting process of partition A of HDD 134 fails, partition A' of SSD 135 is used. Thereby, normal partitions B-D of HDD 134 can be used as they are. Therefore, for example, it becomes usable the address book in partition D, or the like. Accordingly, it becomes usable where restriction of a function is reduced as much as possible.

Then, with reference to FIG. 4, another example of a process by system control part 120 in case of Napping failure to HDD 134 is explained. Firstly, at the time of start of control part 110, system control part 120 executes mounting process of partition A-D of HDD 134, as mentioned the above. At this time, suppose that mounting process of all the partition A-D are failed as indicated as numerals a.

In this case, system control part 120 mounts partitions A'-D' of SSD 135 as indicated as numerals b. Thereby, it replaces with partitions A-D of HDD 134 and is enabled of use of partitions A'-D' of SSD 135. In addition, the capacity of SSD 135 is small as compared with HDD 134. Therefore, the capacity that can be used for boxes decreases. However, as the same as that of the above, it becomes usable where restriction of a function is reduced as much as possible.

Also, system control part 120 displays an icon, or the like, when mounting process of partition A-D of HDD 134 fails. This icon tells that failure, or the like, occurred to panel part 133 via panel operation control part 117, as indicated as numerals c. Also, system control part 120 makes the maintenance mail transmit, as indicated as numerals d. The maintenance mail tells happening for the maintenance via network 140 with network control part 116 and I/F.

Thus, when mounting process of partition A-D of HDD 134 fails, partitions A'-D' of SSD 135 are used. Thereby, although the capacity, which can be used for boxes, decreases, as the same as that of the above, it becomes usable where restriction of a function is reduced as much as possible.

Then, with reference to FIG. 5, an example of the start process of system control part 120 is explained.

(Step S101)

Firstly, system control part 120 is in a state of waiting for turning ON of the power supply in MFP 100 (Step S101: No). When a power supply is turned on (Step S101: Yes), system control part 120 advances to Step S102.

(Step S102)

System control part 120 executes the boot loader memorized in ROM 115.

(Step S103)

Next, when a boot loader is executed, system control part 120 loads OS from SSD 135 to RAM 114.

(Step S104)

Next, when system control part 120 loads OS from SSD 135 to RAM 114, it performs mounting process for HDD 134. For example, in this mounting process, it checks the file system (format) of each partition A-D in HDD 134, or the like.

(Step S105)

Next, system control part 120 determines whether or not mounting process is successful. Here, if the mounting process of all the partition A-D is successful (Step S105: Yes), it advances to Step S106. On the other hand, if the mounting process of any one or all the partition A-D is not successful, it advances to Step S108.

(Step S106)

If it determines that the mounting process of all the partition A-D is successful, system control part 120 loads the application program from SSD 135 to RAM 114. Thus, improvement in the speed of reading of an application program can be attained in loading an application program from SSD 135 to RAM 114.

(Step S107)

After finishing load of the application program to RAM 114, system control part 120 makes shift to normal operation, which all the functions of MFP 100 is usable.

(Step S108)

In Step S105, if mounting process of any one or all the partition A-D is not successful, mounting process of the partition of SSD 135 is performed. That is, as explained in FIG. 3, for example, if mounting process of partition A of HDD 134 fails, it mounts in order that partition A' of SSD 135 can be used. Also, as explained in FIG. 4, if mounting process of all the partition A-D of HDD 134 fails, it mounts in order that partitions A'-D' of SSD 135 can be used.

(Step S109)

Next, as indicated as numerals c in FIG. 3 and FIG. 4, system control part 120 displays the icon or the like, which tells that failure, or the like, is occurred, to panel part 133 via panel operation control part 117.

(Step S110)

Also, system control part 120 makes the maintenance mail transmit via network 140 with network control part 116 and I/F. This is indicated as numerals d in FIG. 3 and FIG. 4. Maintenance mail tells that the happening for maintenance. Then, it advances to Step S107.

In this way, in the present embodiment, by system control part 120 that is a control part, at the time of a start process, mounting process to each partition A-D of HDD 134 that is a first storage device is performed. Next, reading of the application program of SSD 135 that is the second storage device is performed. Then, when the mounting process for either of partition A-D fails, mounting process for partitions A'-D' of the second same storage device about the failed partition A-D is performed.

Thereby, even if a case where failure happens in HDD 134, which is the first storage device, the data any one of partitions A-D of HDD 134, which is normal, can be used as it is. Therefore, it becomes usable where restriction of a function is reduced as much as possible. In addition, the down time can be shortened as much as possible.

Also, in the present embodiment, by system control part 120 that is a control part, in case the mounting process to any one of partition A-D of HDD 134 fails, occurrence of failure is displayed via panel part 133 that is a display part. Then, a maintenance mail is made to transmit via network control part 116 that is a communication part. Thus, it can be told the failure to a user via panel part 133. In addition, it can be automatically told the failure to a specific serviceman or maintenance company.

Especially, by automatically transmitting the maintenance mail, the failure can be immediately told to a specific serviceman or maintenance company. Therefore, while using in the state where restriction of the function is reduced as much as possible, for example, it can wait for providing the maintenance by a serviceman. Also, by telling a user about the failure via panel part 133, if HDD 134 is stocked, it enables to replace HDD 134, immediately.

Also, in the present embodiment, the first storage device is HDD 134 and the second storage device is SSD 135. Therefore, the amount of stored data can be increased by using HDD 134. Further, an application program, or the like, can be read at high speed by using SSD 135.

As explains in detail, in the image processing apparatus of the typical case as mentioned above, only the function that can be executed with the second application previously memorized in ROM without using HDD is provided. Thus, in this case, it is impossible to use all the function by using HDD.

Also, in another typical case as mentioned above, the failure position of storage is detected, and the use with restricting the function based on the detected result is possible. However, when the HDD itself is out of order, it cannot be restored by formatting, and thus down time has occurred in the case.

As compared with this, according to the image forming apparatus of the present disclosure, even if a case where the failure is happened in the first storage device, the data of the normal partition of the first storage device can be used as it is. Thereby, it is enables use in the state where restriction of the function is made reduce as much as possible, and down time can be shortened as much as possible.

In addition, the configuration and operation of the above-mentioned embodiment are an example. Therefore, it cannot be overemphasized that it can change suitably and can execute in the range that does not deviate from the aim of the present disclosure.

What is claimed is:

1. An image forming apparatus comprising:
   a hard disk drive (HDD) as a first storage device that includes a plurality of partitions to store data for each of various functions of the image forming apparatus, wherein the plurality of partitions include a first partition for image data handling, a second partition for a box, a third partition for a system, and a fourth partition for a database having an address book;
   a solid-state drive (SSD) as a second storage device that includes an operating system (OS) image, an application program for executing the various function of the image forming apparatus, and same partitions as the HDD, provided as a reserve of the plurality of partitions of the HDD, wherein the same partitions as the HDD include:
   a first partition of the SSD for the image data handling, the same as the first partition of the HDD,
   a second partition of the SSD for the box, the same as the second partition of the HDD,
   a third partition of the SSD for the system, the same as the third partition of the HDD, and
   a fourth partition of the SSD for a database, the same as the fourth partition of the HDD;
   a read only memory (ROM) that includes a boot loader needed for start of the system;
   a random access memory (RAM) that includes a work memory; and
   a system control part that is controlled to use a reserve storage in the SSD when a malfunction is happened in the HDD, wherein a start process of the system control part includes:

executing the boot loader included in the ROM, when a power supply in the image forming apparatus is turned on;

loading the OS from the SSD to the RAM, when the boot loader is executed;

performing a mounting process for the HDD, when the system control part loads the OS from the SSD to the RAM;

determining whether or not the mounting process for the HDD is successful;

loading the application program from the SSD to the RAM, if the mounting process for the HDD is successful for all the plurality of partitions of the HDD;

wherein the start process of the system control part further includes:

displaying an icon that shows the malfunction is happened in the HDD and transmitting a maintenance mail via a network, if the mounting process for the HDD is not successful for any one of or all the plurality of partitions is not successful;

making the image forming apparatus shift to a normal operation, in which all the functions of the image forming apparatus are usable, after loading the application program from the SSD to the RAM; and performing a partition mounting process for the SSD, if the mounting process for the HDD is not successful for any one of or all the plurality of partitions of the HDD, wherein the partition mounting process for the SSD comprises:

mounting the first partition of the SSD, if the mounting process for the HDD is not successful for the first partition of the HDD, the first partition of the SSD being used as a replacement for the first partition of the HDD, and the second, third, and fourth partitions of the HDD being used, wherein the address book included in the fourth partition of the HDD is usable, and mounting the first, second, third, and fourth partitions of the SSD, if the mounting process for the HDD is not successful for the first, second, third, and fourth partitions of the HDD, the first, second, third, and fourth partitions of the SSD being used as a replacement for the first, second, third, and fourth partitions of the HDD, respectively, wherein the second partition of the SSD for the box is usable although a capacity that can be used for the box decreases.

2. An image formation method by an image forming apparatus that includes:

a hard disk drive (HDD) as a first storage device that includes a plurality of partitions to store data for each of various functions of the image forming apparatus, wherein the plurality of partitions include a first partition for image data handling, a second partition for a box, a third partition for a system, and a fourth partition for a database;

a solid-state drive (SSD) as a second storage device that includes an operating system (OS) image, an application program for executing the various function of the image forming apparatus, and same partitions as the HDD, provided as a reserve of the plurality of partitions of the HDD, wherein the same partitions as the HDD include:

a first partition of the SSD for the image data handling, the same as the first partition of the HDD, a second partition of the SSD for the box, the same as the second partition of the HDD, a third partition of the SSD for the system, the same as the third partition of the HDD, and a fourth partition of the SSD for a database, the same as the fourth partition of the HDD; a read only memory (ROM) that includes a boot loader needed for start of the system;

a random access memory (RAM) that includes a work memory; and a system control part that is controlled to use a reserve storage in the SSD when a malfunction is happened in the HDD, the method comprising:

executing the boot loader included in the ROM, when a power supply in the image forming apparatus is turned on;

loading the OS from the SSD to the RAM, when the boot loader is executed;

performing a mounting process for the HDD, when the system control part loads the OS from the SSD to the RAM;

determining whether or not the mounting process for the HDD is successful;

loading the application program from the SSD to the RAM, if the mounting process for the HDD is successful for all the plurality of partitions of the HDD;

wherein the method further includes:

displaying an icon that shows the malfunction is happened in the HDD and transmitting a maintenance mail via a network, if the mounting process for the HDD is not successful for any one of or all the plurality of partitions is not successful;

making the image forming apparatus shift to a normal operation, in which all the functions of the image forming apparatus are usable, after loading the application program from the SSD to the RAM; and performing a partition mounting process for the SSD, if the mounting process for the HDD is not successful for any one of or all the plurality of partitions of the HDD, wherein the partition mounting process for the SSD comprises:

mounting the first partition of the SSD, if the mounting process for the HDD is not successful for the first partition of the HDD, the first partition of the SSD being used as a replacement for the first partition of the HDD, and the second, third, and fourth partitions of the HDD being used, wherein the address book included in the fourth partition of the HDD is usable, and mounting the first, second, third, and fourth partitions of the SSD, if the mounting process for the HDD is not successful for the first, second, third, and fourth partitions of the HDD, the first, second, third, and fourth partitions of the SSD being used as a replacement for the first, second, third, and fourth partitions of the HDD, respectively, wherein the second partition of the SSD for the box is usable although a capacity that can be used for the box decreases.

* * * * *